(12) United States Patent
Saenger Nayver et al.

(10) Patent No.: US 11,609,448 B2
(45) Date of Patent: Mar. 21, 2023

(54) BALANCED HEATING OF ELECTRO-OPTIC DEVICE USING ACTIVE ELECTRODES

(71) Applicant: GENTEX CORPORATION, Zeeland, MI (US)

(72) Inventors: Mario F. Saenger Nayver, Holland, MI (US); George A. Neuman, Holland, MI (US); Robert R. Turnbull, Holland, MI (US); John S. Anderson, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 377 days.

(21) Appl. No.: 16/991,406

(22) Filed: Aug. 12, 2020

(65) Prior Publication Data

US 2021/0048706 A1 Feb. 18, 2021

Related U.S. Application Data

(60) Provisional application No. 62/885,491, filed on Aug. 12, 2019.

(51) Int. Cl.
*G02F 1/1333* (2006.01)
*G02F 1/155* (2006.01)
(Continued)

(52) U.S. Cl.
CPC .... *G02F 1/133382* (2013.01); *G02F 1/13439* (2013.01); *G02F 1/134309* (2013.01);
(Continued)

(58) Field of Classification Search
CPC ........... G02F 1/134309; G02F 1/13439; G02F 1/1533; G02F 1/155; G02F 1/13338;
(Continued)

(56) References Cited

U.S. PATENT DOCUMENTS

| 5,076,673 | A  | 12/1991 | Lynam et al. |
| 6,356,376 | B1 | 3/2002  | Tonar et al. |

(Continued)

FOREIGN PATENT DOCUMENTS

| WO | 2007103342 A2 | 9/2007 |
| WO | 2016081858 A1 | 5/2016 |

OTHER PUBLICATIONS

International Preliminary Report on Patentability dated Feb. 8, 2022, for corresponding PCT application PCT/US2020/045883, 6 pages.

(Continued)

*Primary Examiner* — James A Dudek
(74) *Attorney, Agent, or Firm* — Price Heneveld LLP; Brian James Brewer

(57) ABSTRACT

A system for heating electro-optic media comprises an electro-optic device comprising: a first substrate having first and second surfaces; a second substrate having third and fourth surfaces; a chamber defined between the opposed third surface of the second substrate and the second surface of the first substrate; electro-optic medium in chamber; a first electrode associated with second surface of first substrate; and a second electrode associated with third surface of second substrate; and a circuit in communication with first and second electrodes, comprising: a first EMF source capable of producing a first voltage; a second EMF source capable of producing a second voltage different from the first voltage; a plurality of switches configured to control the application of first and second voltages to the first and second electrodes; and a controller configured to control the switches, the first EMF source, and the second EMF source.

6 Claims, 15 Drawing Sheets

(51) Int. Cl.
   *G02F 1/153* (2006.01)
   *G02F 1/1343* (2006.01)
   *H05B 3/03* (2006.01)
   *H05B 3/84* (2006.01)
   *H05B 1/02* (2006.01)

(52) U.S. Cl.
   CPC ............ *G02F 1/155* (2013.01); *G02F 1/1533* (2013.01); *H05B 1/0202* (2013.01); *H05B 3/03* (2013.01); *H05B 3/84* (2013.01); *H05B 2203/005* (2013.01); *H05B 2203/013* (2013.01)

(58) Field of Classification Search
   CPC .......... H05B 1/0202; H05B 3/03; H05B 3/84; H05B 2203/005; H05B 2203/013
   See application file for complete search history.

(56) References Cited

U.S. PATENT DOCUMENTS

2005/0041020 A1* 2/2005 Roes ................. G02F 1/133382
   345/211
   2018/0017823 A1 1/2018 Saenger Nayver et al.

OTHER PUBLICATIONS

Search Report dated Oct. 22, 2020, for correspondence PCT application No. PCT/US2020/045883, 3 pages.
   Written Opinion dated Oct. 22, 2020, for correspondence PCT application No. PCT/US2020/045883, 5 pages.

* cited by examiner

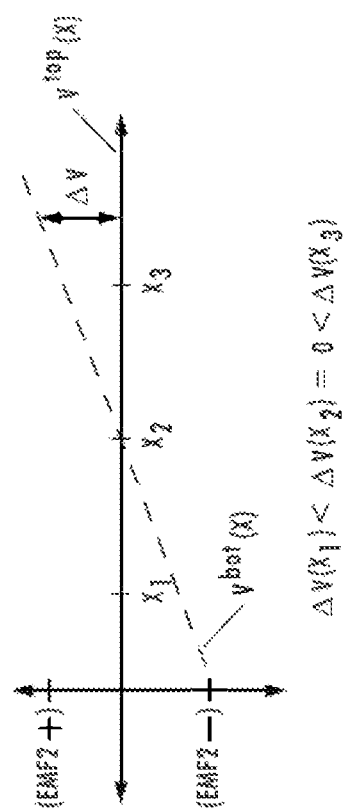

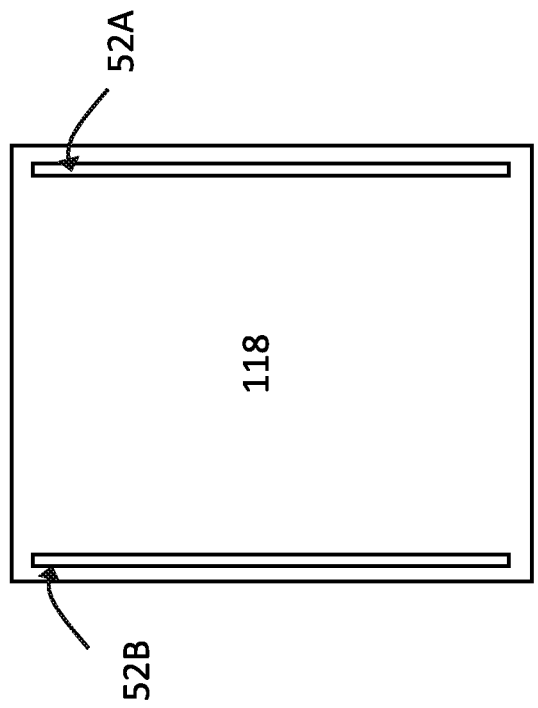
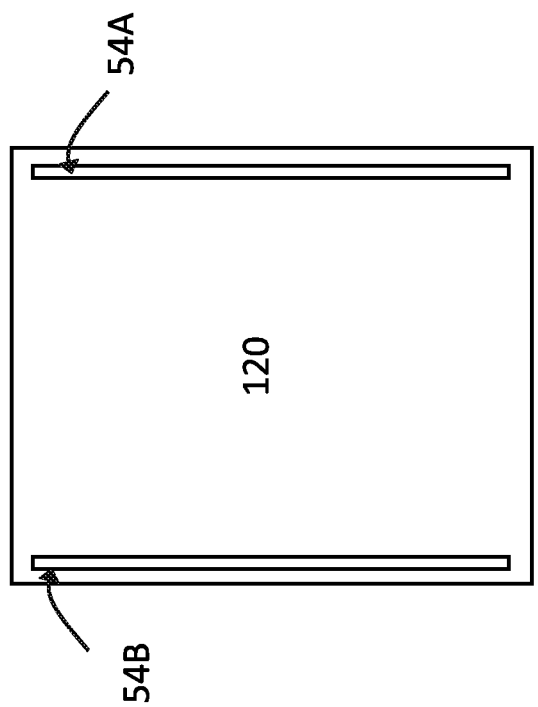
FIG. 1G

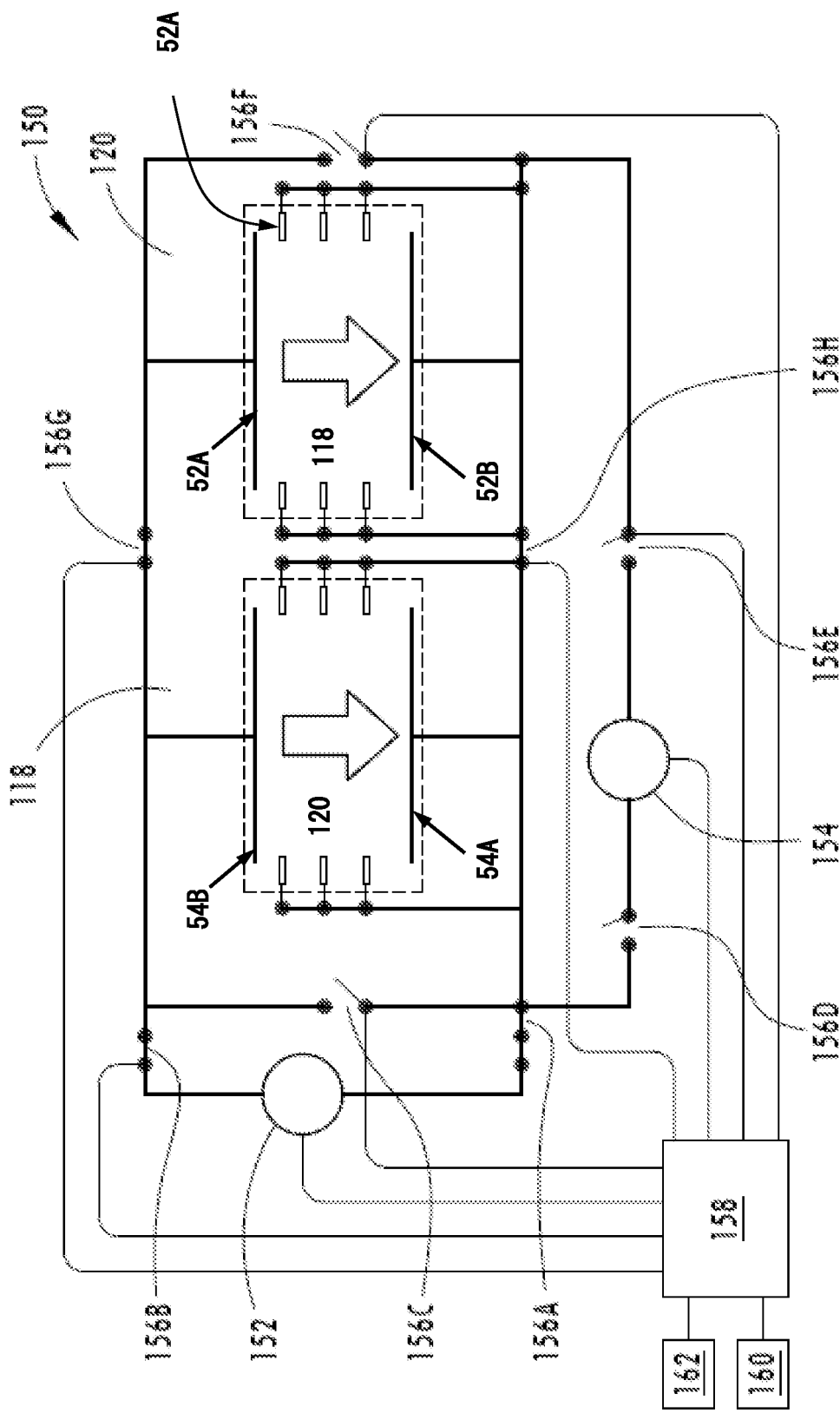

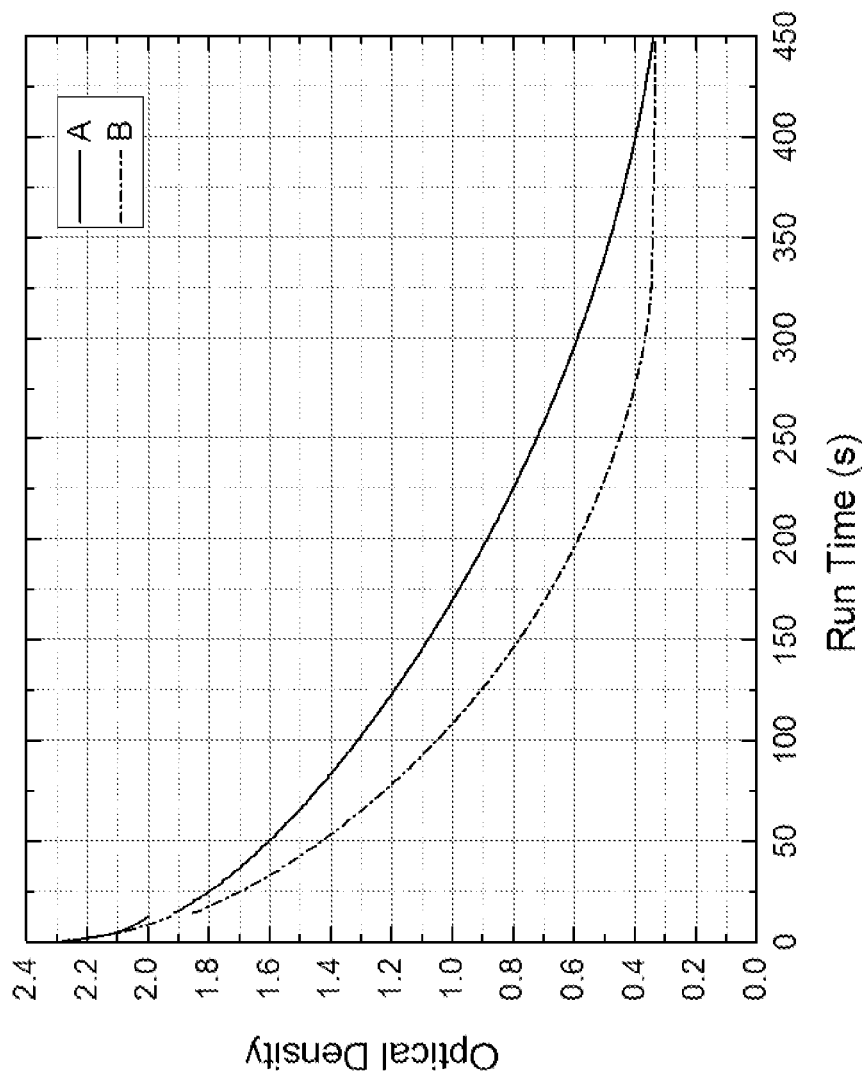
FIG. 5 OD as a function of time for a device operating at -20 deg C with (B) and without (A) heating.

BALANCED HEATING OF ELECTRO-OPTIC DEVICE USING ACTIVE ELECTRODES

CROSS REFERENCE TO RELATED APPLICATIONS

This application claims the benefit of and priority to U.S. Provisional Patent Application No. 62/885,491, filed on Aug. 12, 2019, entitled "Balanced Heating Of Electro-Optic Device Using Active Electrodes," the entire disclosure of which is hereby incorporated herein by reference.

FIELD OF THE DISCLOSURE

This disclosure relates generally to the heating of electro-optic media, and in particular, to the heating of electro-optic media within an electro-optic device by using balanced heating.

BACKGROUND

Electro-optic devices (EO elements) generally contain an electro-optic fluid or medium (EO medium) sandwiched between two substrates, each substrate coated with an electrically conductive coating designed to function as an electrode. Electric current based EO media, such as electrochromic materials, require an electrical current to be applied to the EO media and therefore are required to be in direct contact with the conductive electrode. In contrast, field effect based EO media operate by having a voltage across the material and require an insulating material between the electrode and the EO media to minimize the exposure to electric current flow.

The EO medium may be designed to increase or decrease an optical characteristic of the material such as absorption, reflectance, light scattering or diffusion upon the application or removal of an electrical potential to the electrodes, thereby controlling light transmission, optical density (OD) or reflection through the EO element. This modulation of the optical properties is hereby referred to as switching of the EO media. For simplicity purposes, and unless otherwise specified, we will refer to a current based electro-optic device that can modulate the optical absorption upon application of an electrical voltage. It is understood that an expert in the field would recognize that by introducing the corresponding necessary insulating layers between the EO media and the electrodes one can choose between an electrode for a current- or field effect-based device. At low temperatures, most EO media tend to switch very slowly. At low temperatures, such as −20 deg. C. or lower, it may take up to several hours for certain EO media to switch, practically causing the device to "freeze up". This effect is especially pronounced in memory EC media, which are capable of maintaining a desired level of light transmission upon the removal of the electric potential. Another example can be found in smectic phase liquid crystals.

Heating the EO medium may allow it to switch more rapidly. This may be more beneficial at low temperatures but could also help decrease the time required for switching at higher temperatures such as ambient temperature. It would be desirable to be able to use the active electrodes for heating purposes as well and avoid additional coatings or heat dissipation by having intermediate materials between the heating elements and the EO media. By using the electrodes directly in contact with the EC fluid, the heating efficiency would be also higher than heating through other materials between the heater and the EO medium. It may be desirable to heat and to switch the device independently of each other. However, this may expose the EO media to excessive voltages and/or currents during heating that may cause irreversible damage to the EO medium.

Prior efforts have applied heat to the EO media by applying a DC voltage to only one electrode of the EO element. However, this may result in different areas of the non-powered electrode being at a different electrical potential relative to the powered electrode. Furthermore, since heating generally uses a higher power per area relative to the power per area used to switch the EO material, this arrangement may cause a current to flow through the EO medium, thereby causing the EO element to darken or clear and expose the EO media to an excessive electrical stress. Some EO media, especially current based EO media may be very sensitive to high voltage levels or electrical potentials. Heating current based EO media in this way may expose the EO media to high peak voltages which may, in turn, cause irreversible damage to the current based EO medium.

SUMMARY

According to an aspect, a system for heating electro-optic media may comprise: an electro-optic (EO) device comprising: a first substrate having a first surface and a second surface; a second substrate having a third surface and a fourth surface; a chamber defined between opposed second surface of first substrate and third surface of second substrate; an electro-optic medium disposed within the chamber; a first thin film electrode associated with the second surface of the first substrate; a second thin film electrode associated with the third surface of the second substrate; a first busbar electrode associated with the first thin film electrode; a second busbar electrode associated with the first thin film electrode; a third busbar electrode associated with second thin film electrode; a fourth busbar electrode associated with second thin film electrode; and a circuit in communication with the first and second thin film electrodes. The circuit may comprise: a first EMF source capable of producing a first voltage; a second EMF source capable of producing a second voltage different from the first voltage; a plurality of switches configured to control the application of first and second voltages to the first and second electrodes; and a controller in communication with the circuit and configured to control the switches, the first EMF source, and the second EMF source. The second voltage may be one of lower than and higher than the first voltage.

In a first mode, the plurality of switches may be configured to allow the first EMF source to provide the first voltage to both the first and second electrodes. The first EMF source may be applied so an electrical potential is applied between the first busbar and the second busbar and simultaneously between the third busbar and the fourth busbar through the thin film electrodes. The system may be configured to provide the first voltage at the same polarity and contact geometry to both the first and the second electrodes. In a second mode, the plurality of switches may be configured to allow the second EMF source to provide the second voltage to one of first and second electrodes. The second EMF source may be used to create a potential difference between the first thin film electrode and the second thin film electrode to enable a state change of the electro-optic medium, and thereby to cause switching of the electro-optic medium.

The system further may comprise a temperature sensor in communication with the controller and configured to communicate temperature information to the controller. The temperature information may indicate the temperature of the electro-optic medium. The temperature information may include whether a temperature has exceeded a predetermined threshold. The controller may be configured to cause the provision, by the first EMF source, of the first voltage to both the first and the second electrodes upon the occurrence of certain predetermined conditions. The conditions may include the receipt of information from the temperature sensor that the temperature has exceeded a predetermined threshold. The system further may comprise a user interface in communication with the controller; wherein the conditions include the receipt of an input from the user interface requesting the darkening or clearing of the electro-optic element. The first and third busbars may be disposed opposite to the second and fourth busbars.

According to another aspect, a circuit for causing the selective heating of an electro-optic medium within an EO element may comprise: a first EMF source capable of producing a first voltage; a second EMF source capable of producing a second voltage different from the first voltage; and a plurality of switches. The second voltage may be one of lower than and higher than the first voltage. The switches may be configured to cause the selective isolation of the second EMF source from the circuit and the application of the first voltage to a first and second electrode of the electro-optic element. The switches may also be configured to cause the selective isolation of the first EMF source from the circuit and the application of the second voltage from second EMF source to at least one of the first and second electrodes of the electro-optic element.

The circuit further may comprise a controller in communication with the first EMF source, the second EMF source, and the plurality of switches. The circuit may be configured to selectively isolate the second EMF source from the circuit and apply the first voltage to the first and second electrodes of the electro-optic element upon receipt of information that certain conditions have been met. The circuit further may comprise a temperature sensor in communication with the controller and capable of collecting temperature information, wherein the certain conditions may include a determination based on the temperature information that the temperature may be below a first predetermined threshold. The temperature information may indicate the temperature of the electro-optic medium. The circuit may be capable of, upon a determination by the controller that the temperature may be above a second predetermined threshold, providing a voltage from the second EMF source to at least one of the first and second electrodes of the electro-optic element.

According to another aspect, a method of heating an electro-optic medium in an electro-optic element may comprise: providing a circuit configured to selectively apply a voltage to a first and a second electrode of the electro-optic element; and applying the voltage to the first and second electrodes of the electro-optic element; wherein the voltage applied to the first electrode has the same polarity and contact geometry and may be from the same source as the voltage applied to the second electrode.

The circuit may be in communication with a controller. The method further may comprise the steps of: providing a temperature sensor in communication with the controller and configured to sense a temperature; sensing the temperature by the sensor; communicating information about the temperature to the controller; and determining, by the controller, whether the temperature may be below a first predetermined threshold. The method further may comprise the step of causing, by the controller and upon the sensing of a temperature that may be below the first predetermined threshold, the application of the voltage to the first and the second electrodes of the electro-optic element. The method further may comprise the steps of sensing, by the at least one sensor, a second temperature after the voltage has been applied to both the first and second electrodes; and communicating information about the sensed temperature to the controller. The method further may comprise the step of determining, by the controller, whether the second temperature has reached a second predetermined threshold. The method further may comprise the step of terminating the application of the voltage to the first and second electrodes of the electro-optic element upon a determination that the temperature has reached the second predetermined threshold. The method further may comprise the step of applying a second voltage that may be lower than the first voltage to one of the first and second electrodes of the electro-optic element.

According to another aspect, a system for heating electro-optic media may comprise: an electro-optic (EO) device may comprise: a first substrate having a first surface and a second surface; a second substrate having a third surface and a fourth surface; a chamber defined between second surface of first substrate and third surface of second substrate; an electro-optic medium disposed within the chamber; a first thin film electrode associated with second surface of first substrate; a second thin film electrode associated with third surface of second substrate; a first busbar electrode associated with the first thin film electrode; a second busbar electrode associated with the first thin film electrode; a third busbar electrode associated with second thin film electrode; a fourth busbar electrode associated with second thin film electrode; and a circuit in communication with the first and second electrodes. The circuit may comprise: a first EMF source capable of producing a first voltage; a second EMF source capable of producing a second voltage different from the first voltages; a third EMF source capable of producing a third voltage similar to the first voltage; and a controller in communication with the circuit and configured to control the first, second, and third EMF sources. The three EMF sources may be capable of generating a floating voltage. Second voltage may be higher than or lower than first voltage.

In a first mode, the system may be configured to allow the first and third EMF sources to provide the first and third voltages to the first and second electrodes. The system may be configured to provide the first voltage at the same polarity and contact geometry to the first electrode as the third voltage is applied to the second electrode. This may enable heating of the first and second thin film electrodes. Further, the second voltage may be applied to the first and third EMF sources to generate a potential difference between the first and second thin film electrodes. The potential difference may be capable of switching the EO media from dark to clear or vice versa.

The system further may comprise a user interface in communication with the controller; wherein the conditions include the receipt of an input from the user interface requesting the darkening or clearing of the electro-optic element.

The system further may comprise a temperature sensor in communication with the controller and configured to communicate temperature information to the controller. The temperature information may include whether a temperature has exceeded or fallen below a predetermined threshold. If the temperature has exceeded or fallen below the predetermined threshold, the controller may modulate the power supplied in order to stop heating or to control the temperature of the EO device using a closed feedback loop.

According to another aspect, a system for selectively heating electro-optic media may comprise an electro-optic (EO) device comprising: a first substrate having a first surface and a second surface; a second substrate having a third surface and a fourth surface; a chamber defined between opposed second surface of first substrate and third surface of second substrate; an electro-optic medium disposed within the chamber; a first thin film electrode associated with the second surface of the first substrate; and a second thin film electrode associated with the third surface of the second substrate; and a circuit in communication with the first and second thin film electrodes, comprising: a first busbar electrode associated with the first thin film electrode; a second busbar electrode associated with the first thin film electrode; a third busbar electrode associated with the second thin film electrode; a fourth busbar electrode associated with the second thin film electrode; a first EMF source capable of producing a first voltage and in communication with the first busbar and the second busbar; a second EMF source capable of producing a second voltage different from the first voltage and in communication with at least one of the first and third busbars; a third EMF source capable of producing a third voltage similar in magnitude to the first voltage and in communication with the second busbar and the fourth busbar; a plurality of switches configured to control the application of first and second voltages to the first and second thin film electrodes; and a controller in communication with the circuit and configured to control the switches, the first EMF source, the second EMF source, and the third EMF source. The second voltage may be one of lower than and higher than the first voltage.

The system further may comprise a fourth EMF source in communication with the controller and at least one of the second busbar and the fourth busbar. The system further may comprise an electrical transformer having a fifth EMF source capable of delivering an alternating current voltage. The electrical transformer may comprise a primary winding in electrical communication with fifth EMF source and inductively coupled to a second winding and a tertiary winding. The voltage magnitude of the first EMF source and the third EMF source may be generally the same and the polarity of the voltage of the first EMF source may be opposite the polarity of the third EMF source. The system further may comprise a heating power source; a first amplifier in communication with the third busbar; a second amplifier in communication with the second busbar; a third amplifier; a fourth amplifier; an alternating current power source in communication with the first and second amplifiers; and a power inverter circuit comprising a fifth amplifier and in communication with the alternating current power source; wherein the first, second, third, and fourth amplifiers are in communication with the heating power source.

According to another aspect, a system for selectively heating electro-optic media may comprise an electro-optic (EO) device comprising: a first substrate having a first surface and a second surface; a second substrate having a third surface and a fourth surface; a chamber defined between opposed second surface of first substrate and third surface of second substrate; an electro-optic medium disposed within the chamber; a first thin film electrode associated with the second surface of the first substrate; and a second thin film electrode associated with the third surface of the second substrate; and a circuit in communication with the first and second thin film electrodes, may comprise: a first busbar electrode associated with the first thin film electrode; a second busbar electrode associated with the first thin film electrode; a third busbar electrode associated with the second thin film electrode; a fourth busbar electrode associated with the second thin film electrode; a first EMF source capable of producing a first voltage and in communication with the second busbar and the third busbar.

The circuit further may comprise: a second EMF source in communication with the first busbar and the second busbar and capable of producing a second voltage different from the first voltage; a third EMF source in communication with the third busbar and the fourth busbar and capable of producing a third voltage similar in magnitude to the first voltage; and a plurality of switches configured to control the application of first, second and third voltages to the first and second thin film electrodes. The system further may comprise a controller in communication with the circuit and configured to control the switches, the first EMF source, the second EMF source, and the third EMF source. The system further may comprise a fourth EMF source in communication with the controller and the first busbar and the fourth busbar. The system further may comprise: a dual output electrical transformer comprising at least a first and a second secondary windings inductively coupled to a primary winding, where terminals of the first secondary winding may be in communication with the first and second busbars and terminals of the second secondary winding may be in communication with the third and fourth busbars; and a fifth EMF source capable of delivering an alternating current voltage to the primary winding of the dual output electrical transformer.

The system further may comprise: a heating power source; a first amplifier in communication with the third busbar; a second amplifier in communication with the second busbar; a third amplifier in communication with the fourth busbar; a fourth amplifier in communication with the first busbar; an alternating current power source in communication with the first and second amplifiers; and an inverter circuit comprising a fifth amplifier which may be in communication with the alternating current power source. The first, second, third, and fourth amplifiers may be in communication with the heating power source; and the third and fourth amplifiers may be in communication with an output of the inverter circuit. The system further may comprise a fourth EMF source in communication with the controller and the first busbar and the fourth busbar.

BRIEF DESCRIPTION OF THE DRAWINGS

FIG. 1D illustrates the electric potential distribution along the chamber of the electro-optic element illustrated in FIG. 1C;

FIG. 1G illustrates a top-view schematic representation of the first and second thin film electrodes and first, second, third, and fourth busbars showing mirror symmetry;

FIG. 2 illustrates a circuit diagram of a first mode for providing a current to the electro-optic element in accordance with this disclosure;

FIG. 5 illustrates optical density as a function of time for a device operating at −20 deg. C. with and without heating.

DETAILED DESCRIPTION

Figure 1A:
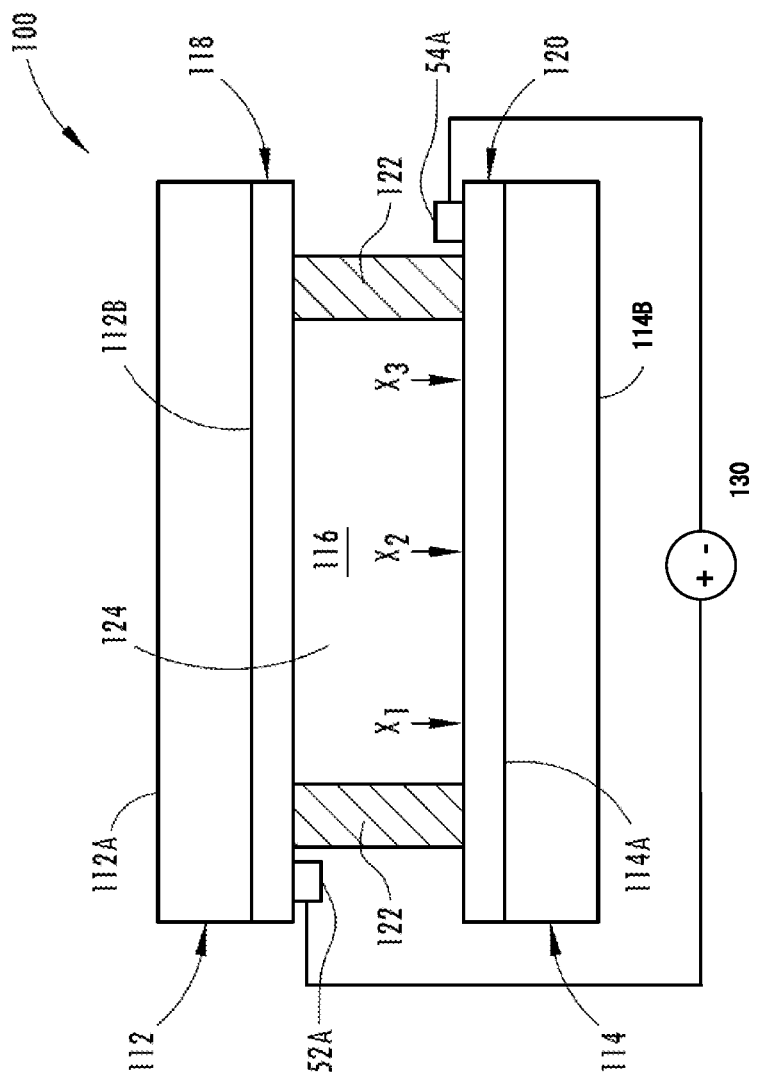
FIG. 1A illustrates a cross-sectional schematic representation of a typical electro-optic element in accordance with this disclosure.

FIG. 1A shows a cross-sectional schematic representation of electro-optic element (EO element) 100. The electro-optic element may be one of an electrochromic element and a liquid crystal element. Electro-optic element 100 may generally comprise a first substrate 112 having a first surface 112A and a second surface 112B, a second substrate 114 having a third surface 114A and a fourth surface 114B, and a chamber 116 defined between opposed second surface 112B of second substrate 112 and third surface 114A of second substrate 114 for containing an electro-optic medium (EO medium) 124.

EO medium 124 may be capable of darkening or clearing upon the application or removal of an electrical potential. In some embodiments, EO medium 124 may comprise memory EO medium.

It may be desirable, especially in cold temperatures, to heat EO medium 124 prior to changing the light transmission characteristics of EO medium 124 and thus the light transmission characteristics of EO element 100. Heating EO medium 124 may allow it to more quickly change its light transmission characteristics, thereby darkening or clearing more quickly upon receipt of an appropriate input. This may be especially true for memory EO media which is formulated to be capable of maintaining a desired level of light transmission even upon the removal of the electric potential. Memory EO media may be especially sensitive to cold temperatures and may therefore darken or clear much more slowly than desired when it is at cold temperatures, for example, temperatures below freezing. Memory EO medium 124 may be sensitive to operating temperatures and may darken or clear very slowly in low temperatures.

One or more layers of electrically conductive material or a first thin film electrode coating 118 may be associated with second surface 112B of first substrate 112. These layers may serve as a first thin film electrode for the electro-optic device. The first thin film electrode 118 may be of a material that: (a) is substantially transparent in the visible region of the electromagnetic spectrum; (b) bonds reasonably well to first substrate 112; (c) maintains this bond when associated with a sealing member; (d) is generally resistant to corrosion from materials contained within the electro-optic device or the atmosphere; and (e) exhibits minimal diffusion or specular reflectance as well as sufficient electrical conductance. Thin film electrode 118 may be fabricated from indium tin oxide (ITO), aluminum doped zinc oxide (AZO), fluorine doped tin oxide (FTO), indium zinc oxide (IZO), TCO-metal-TCO (IMI) structures, conductive mesh, or other materials known to those having ordinary skill in the art. An electrically conducting material or first busbar electrode 52A may be in electrical contact with the first thin film electrode 118. In some embodiments, a second busbar electrode 52B (as shown in FIG. 1E) may also be in electrical contact with first thin film electrode 118. The electrically conductive material used in the busbar electrode may be a material that is: substantially opaque in the visible region of the electromagnetic spectrum; bonds reasonably well to the first thin film electrode 118; maintains this bond when associated with a sealing member; is generally resistant to corrosion from materials in the external or internal environment of the chamber 116.

Similarly, one or more layers of electrically conductive material forming a second thin film electrode 120 may be associated with third surface 114A of second substrate 114 and may serve as a second thin film electrode for EO element 100. In addition to the properties described for first thin film electrode 118, the properties of the second thin film electrode 120 may further include being partially transparent or partially reflective or opaque and reflective. Second thin film electrode 120 may incorporate metals such as chromium, silver based alloys, ruthenium, or other metallic materials known to those having ordinary skill in the art. Second thin film electrode 120 may be operatively bonded to first thin film electrode 118 by sealing member 122. Once bonded, sealing member 122 and the juxtaposed portions of first and second thin film electrodes 118 and 120 serve to define an inner peripheral geometry of chamber 116. Similarly, an electrically conducting material or a third busbar electrode 54A may be in electrical contact with the second thin film electrode 120. In some embodiments, a fourth busbar electrode 54B (as shown in FIG. 1E) may also be in electrical contact with second thin film electrode 120. A first EMF source 129 (not shown in FIG. 1A) may be capable of delivering a floating voltage to EO element. A second EMF source 130 capable of delivering a voltage in the range to switch the EO material 124 may be electrically connected to first and third busbars 52A and 54A.

For current based EO elements 100, the steady state operation current is unique for each operating voltage. The optical absorption of a non-memory electro-optic device is unique also for a given temperature and operating voltage. Similarly, the optical state of a field effect device has a unique impedance at different operating voltage and temperature. Therefore, one could also use temperature dependent characteristics of a selected EO element 100 such as steady state current for a non-memory electro-optic device, the draw current of an electro-optic memory device or the impedance of a field effect device in order to calculate the effective temperature of the EO media and target certain optical state specified by the controller or the user. A temperature sensor may incorporate a multitude of inputs, for example, a temperature dependent resistance of a thermistor, a temperature dependent resistance of at least one of the thin film electrodes, a steady state current or an impedance of the EO media at a certain operating voltage. A controller may be configured to cause the provision, by the first and second EMF sources 129 and 130, of the first and second voltages to heat or stop heating both the first and the second thin film electrodes 118, 120 upon the occurrence of certain predetermined conditions. The conditions may include the receipt of information from temperature sensor that the temperature has exceeded or fallen behind a predetermined threshold.

Figure 1B:
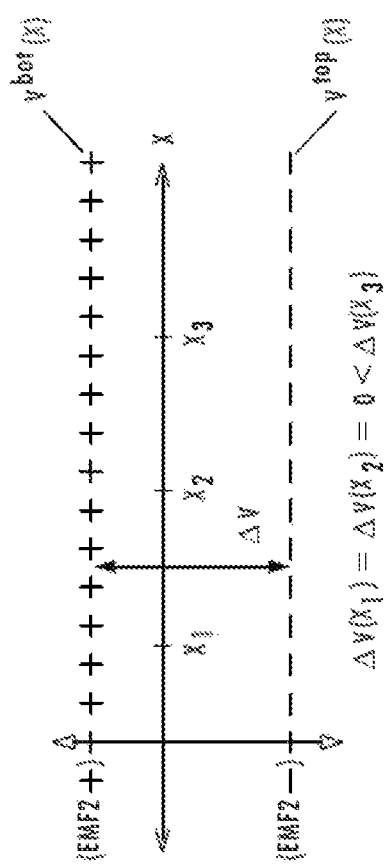
FIG. 1B illustrates the electric potential distribution along the chamber of the electro-optic element illustrated in FIG. 1A.

FIG. 1B depicts the electric potential distribution along the cross section shown in FIG. 1A corresponding to the voltage applied to EO medium 124 as a function of location within chamber 116. Neglecting the sheet resistance effect from first and second thin film electrodes 118 and 120, the electric potential difference ΔV across the EO medium is the same for all locations within chamber 116. In the example shown, the electrical potential difference across the EO medium is the same for locations x1, x2 and x3. The electric potential difference at a given position may be determined from the following equation:

$$\Delta V(x) = V^{top}(x) - V^{bottom}(x) \quad \text{(Equation 1)}$$

where $V^{top}(x)$ is the potential at the surface of first thin film electrode 118 and $V^{bottom}(x)$ is the potential at the surface of second thin film electrode 120. In FIG. 1A, $\Delta V(x_1) = \Delta V(x_2) = \Delta V(x_3)$, and are constant. Equation 1 defines the condition required for a balanced heating condition. X refers to any given location in the element, and may be a 2-dimensional or a 3-dimensional parameter.

Using the configuration depicted in FIG. 1A to darken EO medium 124 within chamber 116, second EMF source 130 may apply a low voltage to both first busbar electrode 52A and third busbar electrode 54A. The low voltage may be sufficient to cause the EO medium to either darken or clear. Using this configuration for heating would require exposure to a high voltage to first and third busbar electrodes 52A and 54A. The voltage would need to be significantly higher than the operational voltage. This would result in irreversible damage to EO medium 124. Therefore, this configuration is not applicable or recommended for heating EO medium 124.

Figure 1C:
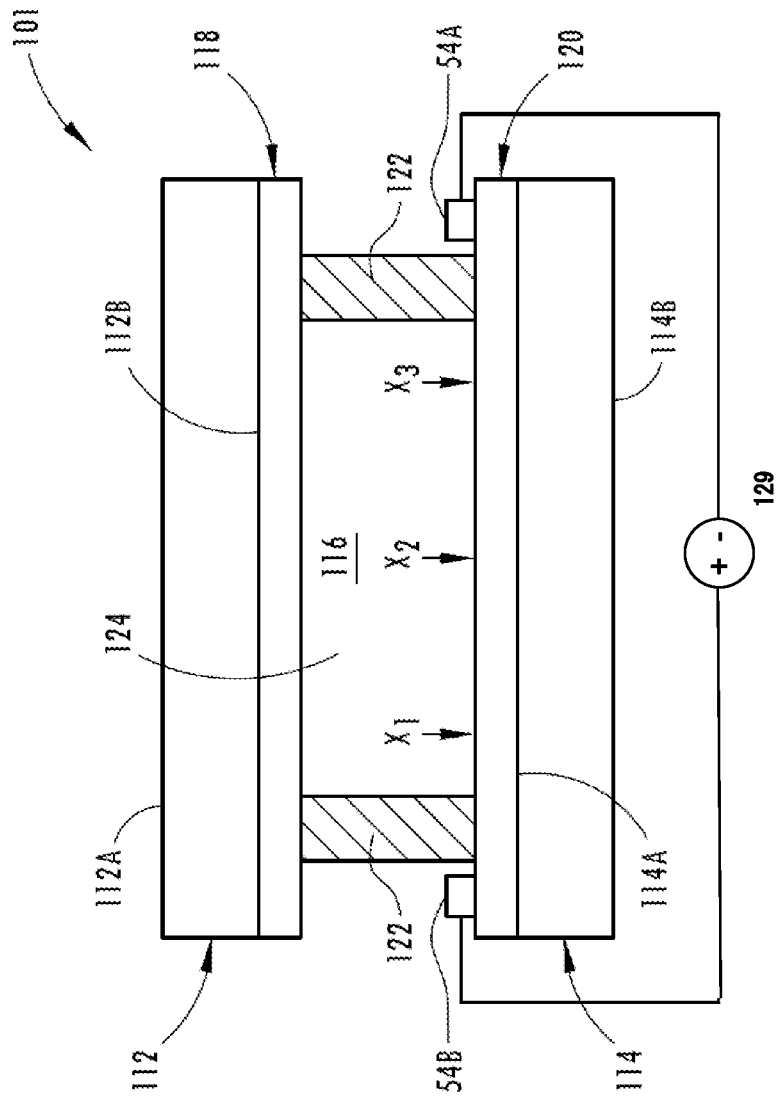
FIG. 1C illustrates a cross-sectional schematic representation of an electro-optic element with an unbalanced heating electrode configuration.
Figure 1E:
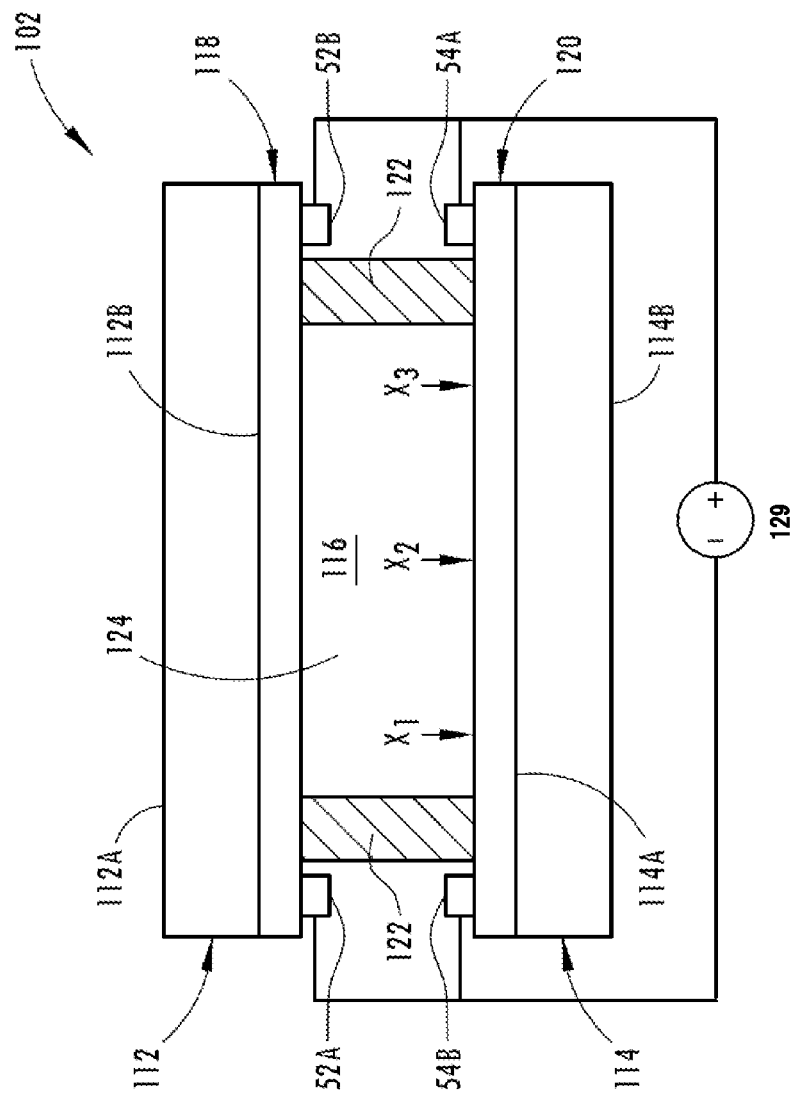
FIG. 1E illustrates a cross-sectional schematic representation of an electro-optic element with a balanced heating electrode configuration.

FIG. 1C shows a cross-sectional schematic representation of electro-optic element 101. In addition to the components in electro-optic element 100, electro-optic element 101 may further comprise a second busbar 52B electrode (not shown in FIG. 1C) associated with first thin film electrode 118 and/or a fourth busbar electrode 54B associated with second thin film electrode 120. First EMF source 129 may be capable of delivering a floating voltage. Applying an electric potential to third and fourth busbar electrodes 54A and 54B would not be able to darken electro-optic element 101, but would heat electro-optic element 101. However, in this configuration, the electric potential difference between the thin film electrodes 118 and 120 may continuously vary such that electro optic medium 124 is exposed to a voltage, especially near the busbars, which may cause an undesired non-uniform darkening of electro-optic element 101 in addition to exposing electro-optic medium 124 to a potentially damaging voltage.

FIG. 1D illustrates an electric potential distribution along a cross section of electro-optic element 101 corresponding to the voltage applied to EO medium 124 as a function of location within chamber 116. The potential difference ΔV between the second surface of the first substrate thin film electrode 118 and the thin film electrode of the third surface of the second substrate 114 changes continuously and locations near the busbars show the largest potential differences. While the potential is constant or near zero for first thin film electrode 118, the potential is gradually changing in second thin film electrode 120. These large potential differences would create an undesired darkening of EO medium 124 during heating and if the voltage is higher than the nominal voltage for darkening EO medium could be damaged irreversibly if exposed to a high voltage. In FIG. 1C, $\Delta V(x_1) < \Delta V(x_2) = 0 < \Delta V(x_3)$.

FIG. 1E shows a cross-sectional schematic representation of an electro-optic element 102 with balanced heating. In addition to the components present in electro-optic element 101, electro-optic element 102 may further comprise a second busbar electrode 52B associated with the first thin film electrode 118. By connecting in parallel first and third busbar electrodes 52A and 54A, as well as second and fourth busbar electrodes 52B and 54B and applying a voltage difference between both sets of busbars it is possible to heat the thin film electrodes on the second surface of first substrate 112 and on third surface of second substrate 114 without applying a voltage difference for each location along the cross section of chamber 116. The potential difference across first and second busbar electrodes 52A and 52B is the same as the potential difference between third and fourth busbar electrodes 54A and 54B for cases where the sheet resistance from one thin film electrode is up to 10 times the sheet resistance from the other thin film electrode.

Figure 1F:
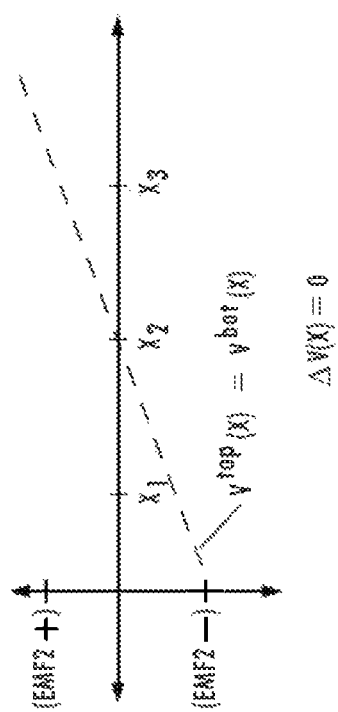
FIG. 1F illustrates the electric potential distribution along the chamber of the electro-optic element illustrated in FIG. 1E.

FIG. 1F depicts the electric potential distribution along the cross section shown in FIG. 1E corresponding to the voltage applied to the EO medium 124 as a function of location in chamber 116. In this figure, $\Delta V(x) = 0$. The potential difference ΔV between first thin film electrode 118 of the second surface of the first substrate 112 and thin film electrode 120 of the third surface of the second substrate 114 approaches zero, therefore preventing any unwanted darkening of the fluid while enabling the heating of the fluid without any irreversible damage.

FIG. 1G depicts the top view of the first thin film electrode 120 with the third and fourth busbars 54A and 54B, and the top view of the second thin film electrode 118 with the first and second busbars 52A and 52B. The electrode and busbar configuration on the second surface of the first substrate 112B and the electrode and busbar configuration on the third surface of the second substrate 114A have mirror symmetry with respect to the axis of rotation 119. For simplicity, this embodiment is drawn with the busbars generally parallel to the axis of rotation 119, but non-parallel electrodes may also be used and still be within the scope of this disclosure. The mirror symmetry allows the voltage drop on first thin film electrode 118 and second thin film electrode 120 during heating to occur at the same rate for each location, therefore having a negligible potential difference ΔV due to heating at the EO media.

Figure 1H:
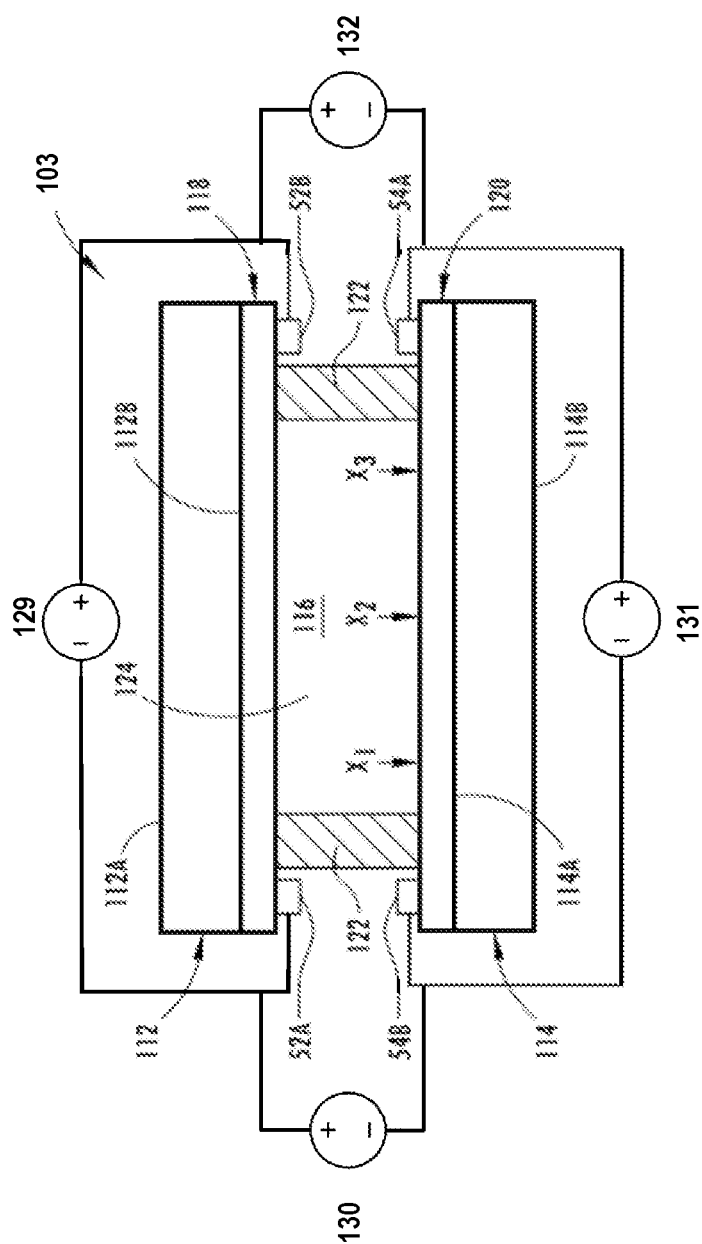
FIG. 1H illustrates a cross-sectional schematic representation of an electro-optic element with an independent balanced heating and EO media switching configuration.

FIG. 1H shows a cross-sectional schematic representation of an electro-optic element 103 capable of independently performing balanced heating and switching of the EO media 124. In addition to the components present in electro-optic element 101 and electro-optic element 102, electro-optic element 103 may further comprise a third EMF source 131 capable of delivering a floating voltage similar in magnitude and polarity to first EMF source 129.

By connecting first EMF source 129 to first and second busbars 52A and 52B on the first thin film electrode 118, and connecting third EMF source 131 to third and fourth busbars 54A and 54B on the second thin film electrode 120, and connecting one polarity of second EMF source 130 in parallel to first and third busbars 52A and 54A, and the other polarity of second EMF source 130 in parallel to second and fourth busbars 52B and 54B; it is possible to switch the EO media 124 supplying voltage with second EMF source 130 and it is possible to independently heat the EO media 124 by supplying voltage with the first and third power supplies 129 and 131 simultaneously. However, the heating voltages supplied by the first and third heating power supplies 129 and 131 need to be controlled such that they are applied simultaneously with similar magnitude and polarity. If the voltages supplied by the first and third heating power supplies 129 and 131 are not supplied simultaneously it can expose the EO media 124 to electrical stress, thereby causing irreversible damage.

By applying a first heating voltage to first and third busbars 52A and 54A, simultaneously applying a second heating voltage of equal or similar magnitude to the first voltage to second and fourth busbars 54B and 52B such that the polarity connected to third busbar 54A is the same as the polarity going to fourth busbar 52B, it is possible to heat the EO media 124 without exposing the EO media 124 to a switching voltage. Independently of whether first and second heating voltages are being operated, by applying a switching voltage to second and third busbar 54B and 52A it is possible to switch the EO media 124. Optionally, one can further apply an additional second switching voltage to third and second busbars 54A and 52B, either independently of or simultaneously with the first switching voltage, to have a more uniform switching of the EO device 103.

Figure 1I:
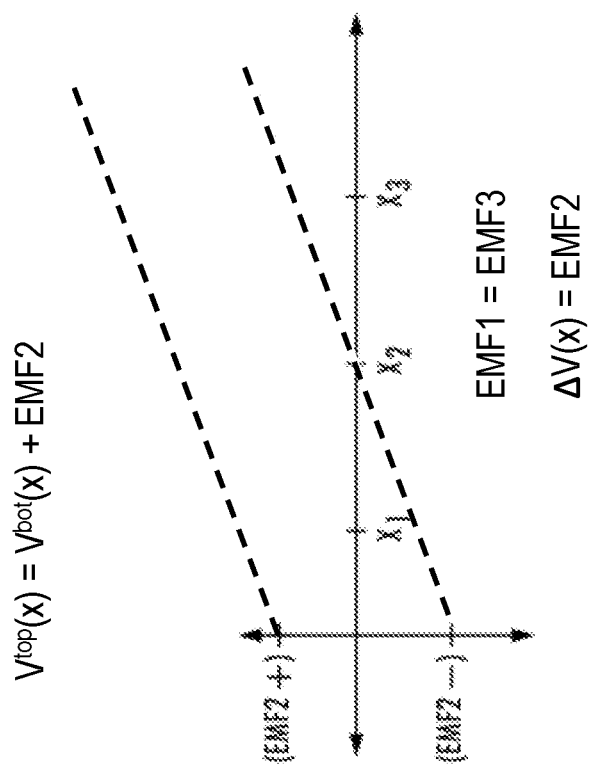
FIG. 1I illustrates the electric potential distribution along the chamber of the electro-optic element illustrated in FIG. 1H during heating and switching.

FIG. 1I depicts the electric potential distribution along the cross section shown in FIG. 1H corresponding to the voltage applied to the EO medium 124 as a function of location in chamber 116 when the heating voltage from first and third EMF sources 129 and 131, as well as the switching voltage from the second EMF source 130 is being applied simultaneously. In this figure, the potential difference at a location x is defined by equation 2:

$$\Delta V(x) = V^{top}(x) - V^{bottom}(x) = EMF2 \quad \text{(Equation 2)}$$

The potential difference $\Delta V$ between the first thin film electrode 120 and the second thin film electrode 118 may approach the potential applied by second EMF source 130, therefore switching the EO media 124 while also enabling the heating of the EO media 124 without any irreversible damage. Equation 2 defines the condition for simultaneous and independent switching and balanced heating of the EO medium 124. The heating voltage and the switching voltage may be time-dependent in relation to the application of either a direct current source or an alternating current source.

Figure 1J:
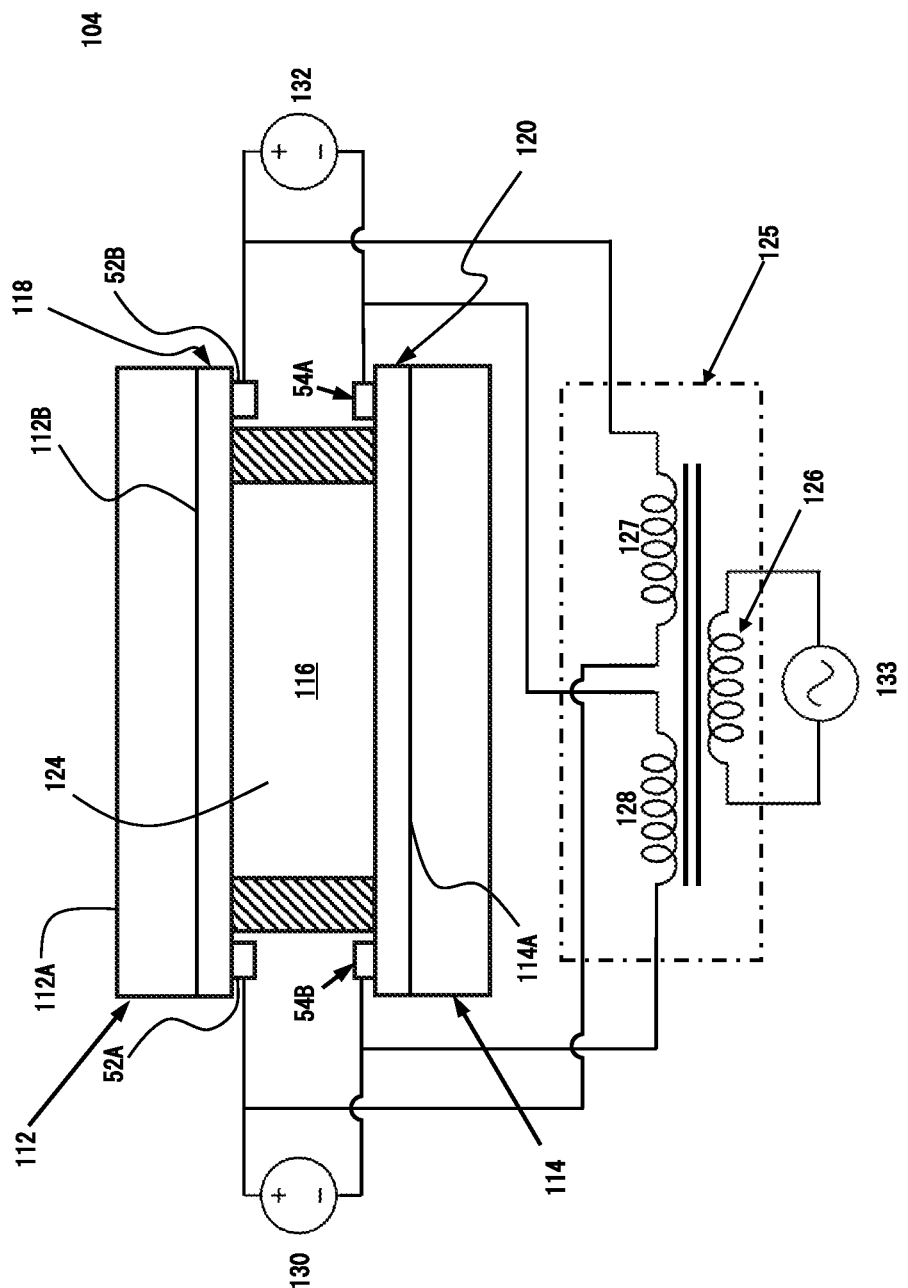
FIG. 1J illustrates a cross-sectional schematic representation of an electro-optic element with an independent balanced AC heating and EO media switching configuration.

FIG. 1J shows a cross-sectional schematic representation of an electro-optic element 104 capable of independently performing self-balanced heating and switching of the EO media 124. In addition to the components present in electro-optic elements 103, 102, and 101, electro-optic element 104 may further comprise an electrical transformer 125. Electrical transformer 125 may include a fifth EMF source 133 capable of delivering an alternating current (AC) voltage. Electrical transformer 125 may further comprise a primary winding 126, a secondary winding 127 and a tertiary winding 127. Primary winding 126 may be electrically connected in series to fifth EMF source 133. Primary winding 126 may be inductively coupled to secondary and tertiary windings 127 and 128 such that when an AC voltage is applied to primary winding 126, an alternating voltage is generated at secondary and tertiary windings 127 and 128. Secondary winding 127 may comprise two terminals, a first AC terminal AC1 and a second AC terminal AC2. Similarly, tertiary winding 128 may comprise two terminals, a third AC terminal AC3 and a fourth AC terminal AC4. The orientation of first, second, and third windings 126, 127, 128, is such that the voltage magnitude and polarity of the first and third AC terminals AC1 and AC3 may be of the virtually the same magnitude and of opposite symbol as the voltage and polarity of second and fourth AC terminals AC2 and AC4.

By supplying an AC voltage from fifth EMF source 133, an AC voltage may be generated on the four AC terminals AC1, AC2, AC3 and AC4 according to the following equation:

$$AC1 = -AC2 = AC3 = -AC4$$

By electrically connecting first and third AC terminals to second and third busbars 52B and 54A respectively and by electrically connecting second and fourth AC terminals to first and fourth busbars 52A and 54B, it may be possible to generate a heating voltage across first and second thin film electrodes 118 and 120 without exposing the EO media 124 to a voltage and preventing it from switching or getting electrically damaged. This embodiment requires only one power supply for heating and therefore may remove the need to control the heating voltage applied to first and second thin film electrodes 118 and 120. Therefore, this may be referred to as self-balanced heating.

In order to heat EO medium 124, circuit 150 may apply a voltage to both first and second thin film electrodes 118, 120. It may be desirable to use the same EMF source with the same polarity and contact geometry to apply the voltage to both first and second thin film electrodes 118, 120. This may avoid passing current through EO medium 124. This balanced configuration may allow the heating of EO medium 124 while not damaging EO medium 124.

In contrast, applying an uneven voltage such as applying a higher voltage to one electrode than to the other may result in a current passing through EO medium 124. This, in turn, may cause EO medium 124 to clear or to darken. If the difference between the voltages on the first and second thin film electrodes 118, 120 is high enough, damage to EO medium 124 may result. However, applying a voltage having the same magnitude and polarity to both first and second thin film electrodes 118, 120 may allow the use of a higher voltage for heating thin film electrodes 118, 120 and, thus, the heating of EO medium 124 without exposing EO medium 124 to too high a voltage and risking damaging it. In addition, applying the same potential to both first and second thin film electrodes 118, 120 simultaneously may also result in heating EO medium 124 from both sides, resulting in more rapid heating.

Although a higher electric potential may be required to heat EO medium 124 than to cause EO element 100 to darken or clear, exposing EO medium to the higher voltage 124 may damage EO medium 124. Applying the same voltage used to cause EO medium 124 to darken or clear may not provide sufficient potential to heat EO medium 124, or may heat it very slowly. Furthermore, applying the same voltage used to cause EO medium 124 to darken or clear in an effort to heat EO medium 124 may cause an unwanted change in the light transmission characteristics of EO medium 124.

Figure 1K:
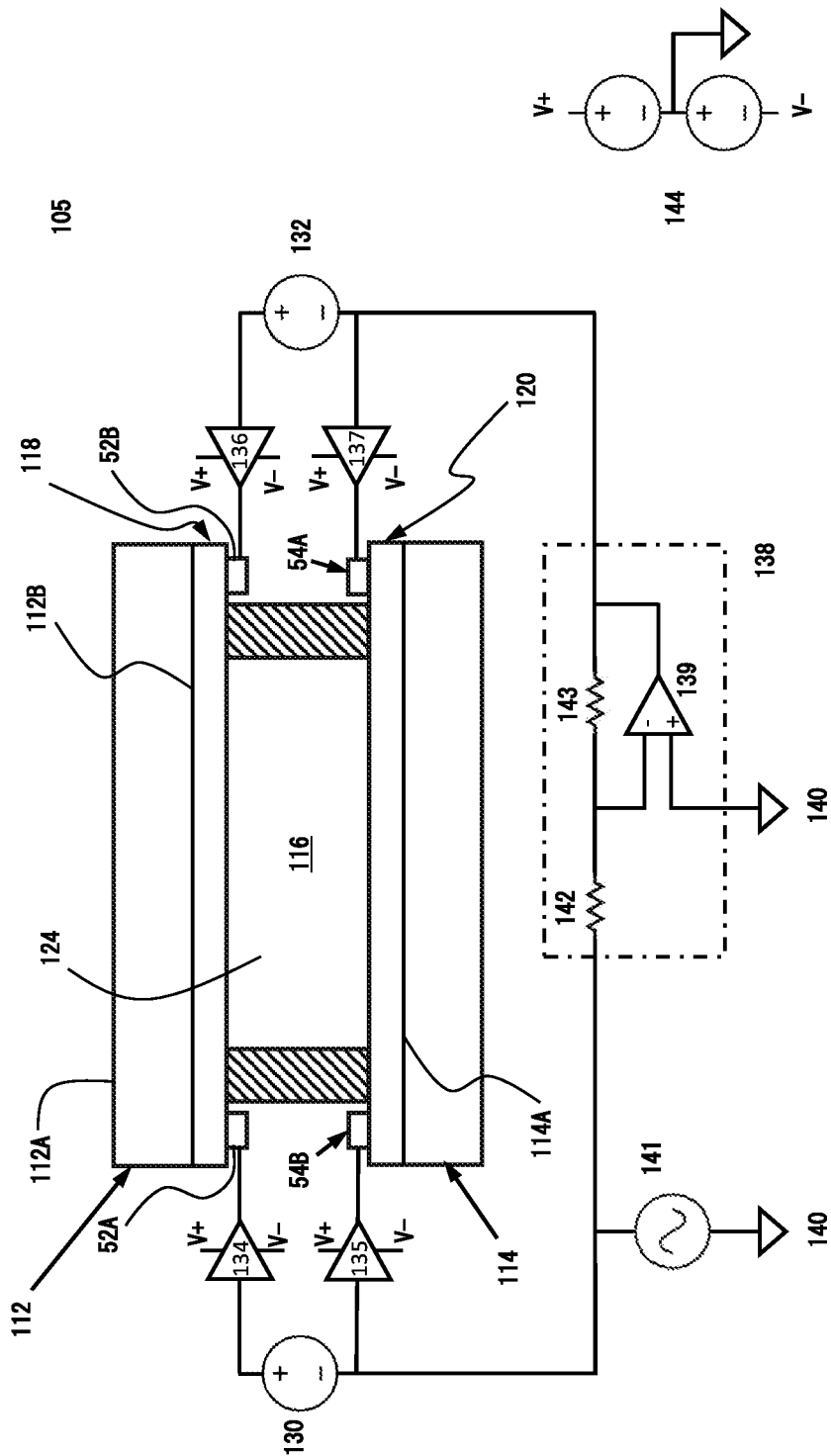
FIG. 1K illustrates a cross-sectional schematic representation of an electro-optic element with an independent balanced AC heating and EO media switching configuration.

FIG. 1K shows a cross-sectional schematic representation of yet another embodiment of an electro-optic element 105 capable of independently performing self-balanced heating and switching of the EO media 124. In addition to the components present in electro-optic elements 103, 102 and 101, electro-optic element 105 may further comprise a heating power source 144, a first, second, third and fourth amplifiers 134, 135, 136 and 137, an alternating current (AC) power source 141 and a power inverter circuit 138. The first amplifier 134 is connected to the third busbar 52A on the second thin film electrode 118, and the second amplifier 135 is connected to the second busbar 54B on the first thin film electrode 120. To simplify the schematic, the connections between the heating power source 144 outputs, denominated as V+ and V− that provide power to the first, second, third and fourth amplifiers are omitted, and the power source is depicted separately. The AC power source 141 is grounded in one polarity and the output is connected to amplifiers 134 and 135, as well as to the power inverter circuit 138. The power inverter circuit 138 comprises a fifth amplifier 139, an input resistor 142 and a feedback resistor 143. The ratio of the resistance of the input resistor 142 and feedback resistor 143 is approximately unity, that is, the inverter circuit is inverting the polarity of the input signal without considerably modifying the amplitude of the input signal generated by the AC power source 141. Additionally, a first switching power source 130 is connected between first and second amplifiers 134 and 135 to enable switching of the electro-optic media 124. Optionally, one can further apply an additional second switching power source 132 to third and fourth amplifiers 136 and 137 to enable a switching voltage to be applied on the first and fourth busbars 54A and 52B.

Figure 3:
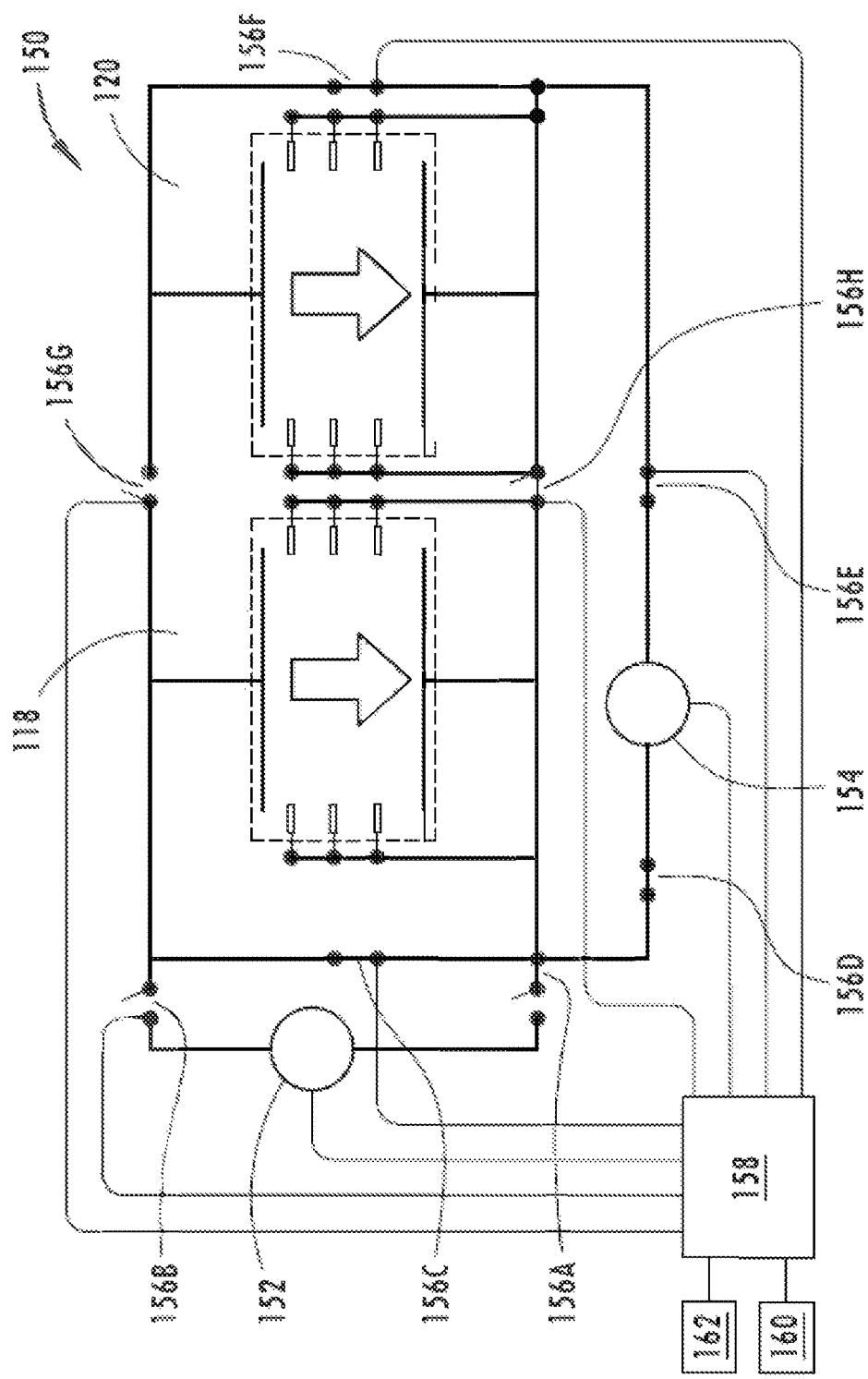
FIG. 3 illustrates a circuit diagram of a second mode for providing a current to the electro-optic element in accordance with this disclosure.

Referring now to FIGS. 2 and 3, a circuit, generally indicated at 150, may be configured to allow the selective application of a first voltage to both thin film electrodes 118, 120 of EO element 100 in order to heat EO medium 124 of EO element 100 and to allow the selective application of a second voltage to one of first and second thin film electrodes 118, 120 of EO element 100 in order to control the light transmission characteristics of EO medium 124. Circuit 150 may be configured to apply first and second voltages sequentially one at a time or simultaneously.

First EMF source 152 may be configured to apply the first voltage to heat first and second thin film electrodes 118, 120. This, in turn, may heat the EO medium 124 which may be disposed between first and second thin film electrodes 118, 120. Second EMF source 154 may be configured to apply the second voltage to one of first and second thin film electrodes 118, 120 in order to control the light transmission characteristics of EO medium 124. First EMF source 152 may be configured to provide a higher voltage potential than second EMF source 154. In some embodiments, first EMF source 152 may be configured to provide at least twice as much voltage as second EMF source 154. The voltage required to heat first and second thin film electrodes 118, 120 in order to increase the temperature of EO element 100 sufficiently prior to activation of EO element 100 may be at least 0.1 W/in2.

Electrical switches 156A-156H may be configured to control the current flow in circuit 150. The application of one of first and second voltages to first and second thin film electrodes 118, 120 of EO element 100 may be controlled by controlling the position of switches 156A-156H. A heating mode and an electro-optic mode may be separated by switches 156A-156H. In some embodiments, switches 156A-156H may be MOSFETS.

Switches 156A and 156B may be configured to selectively isolate first EMF source 152 from circuit 150. Positioning switches 156A and 156B in an open position may isolate first EMF source 152 from circuit 150 while positioning switches 156A and 156B in a closed position may keep first EMF source 152 in circuit 150. Switches 156D and 156E may be configured to selectively isolate second EMF source 154 from the circuit 150. Positioning switches 156D and 156E in an open position may isolate second EMF source 154 from the circuit 150 while positioning switches 156D and 156E in a closed position may keep second EMF source 154 in circuit 150.

When it is desired to apply the first voltage to first and second thin film electrodes 118, 120 to heat EO medium 124, as shown in FIG. 2, first EMF source 152 may be activated, switches 156A and 156B may be in a closed position, and switches 156D and 156E may be in an open position. This keeps first EMF source 152 in the circuit 150 while removing second EMF source 154 from the circuit 150. Switches 156C and 156F may be in an open position to prevent short-circuiting. Switches 156G and 156H may be in a closed position, thereby forcing current through both first and second thin film electrodes 118, 120. Applying the first voltage to both first and second thin film electrodes 118, 120 may cause them to heat up which, in turn, may cause EO medium 124 to increase in temperature. The voltage of first EMF source 152 may be applied evenly to both first and second thin film electrodes 118, 120.

Applying electrical potential to the system in this manner may ensure that the potential provided has the same polarity and the same voltage. A potential difference between first and second thin film electrodes 118, 120 which would otherwise cause EO medium 124 to darken or clear may be reduced or avoided. Applying an electrical potential that has the same polarity and the same voltage to each of first and second thin film electrodes 118, 120 may prevent creating a high potential difference between first and second thin film electrodes 118, 120 during heating. This, in turn, may prevent damage to first and second thin film electrodes 118, 120.

Referring now to FIG. 3, second EMF source 154 may be activated to apply the second voltage to the system in order to cause a change in the light transmission characteristics of EO medium 124. Second EMF source 154 may provide a sufficient potential to cause EO medium 124 to darken or clear. Switches 156D and 156E may be disposed in a closed position to keep second EMF source 154 in circuit 150, thereby allowing second EMF source 154 to direct current to the system. Switches 156A and 156B may be disposed in an open position to isolate first EMF source 152 from circuit 150. Switches 156G and 156H may be open and switches 156C and 156F may be closed, thereby directing current through one of first and second thin film electrodes 118, 120 while preventing it from flowing through the other of first and second thin film electrodes 118, 120. As shown, current is directed to first thin film electrode 118, but current could instead be directed to second thin film electrode 120 and still be within the scope of this disclosure. Since current is supplied to only one of first and second thin film electrodes 118, 120, a potential difference may be created between first and second thin film electrodes 118, 120, and EO medium 124 may darken or clear. To complete the circuit, current may flow through EO medium 124. Providing electrical potential to the system in this manner may allow the control of the light transmission characteristics of EO medium 124.

In some embodiments, EO element 100 may further comprise a controller 158. Controller 158 may be in communication with and configured to control first and second EMF sources 152, 154 and switches 156A-156H.

In some embodiments, EO element 100, 103 or 104 may comprise at least one sensor 160 in communication with controller. The at least one sensor 160 may be configured to monitor a temperature. In some embodiments, the at least one sensor 160 may be configured to monitor the temperature of EO medium 124. In some embodiments, the at least one sensor 160 may be configured to monitor an ambient temperature. In some embodiments, the at least one sensor 160 may be configured to monitor the temperature of one of first and second substrates 112, 114. Where the temperature sensed is not the temperature of EO medium 124, the temperature sensed may provide an indication of the temperature of EO medium 124.

The at least one sensor 160 may be in communication with controller 158, and may be configured to transmit information to controller 158. In some embodiments, the at least one sensor 160 may be configured to communicate information about the temperature to controller 158. The information communicated about the temperature may include, for example, the temperature itself or whether the temperature is within a predetermined temperature range or above or below a predetermined temperature threshold. Upon receipt of the information about the temperature, controller 158 may determine whether to cause the first voltage to be applied to first and second thin film electrodes 118, 120 to heat EO medium 124. In some embodiments, upon the existence of particular conditions, controller may be configured to cause circuit 150 to cause the first voltage to be applied to first and second thin film electrodes 118, 120, thereby heating electro-optic medium 124. The particular conditions may include, for example, receiving instructions to darken or clear EO element 100 or the detection or an indication of a temperature of EO medium 124 below a predetermined threshold.

In some embodiments, EO element 100 may be configured to automatically determine whether to darken or clear. At least one second sensor 162 may be in communication with controller 158. The at least one second sensor 162 may sense, for example, ambient light conditions and/or ambient temperatures, and may communicate that information to controller 158. Controller 158 may be configured to determine, based on predetermined criteria, whether to change the light transmission characteristics of EO element 100 based on inputs received from the at least one second sensor 162. If controller 158 determines that the light transmission characteristics of EO element 100 should be changed, controller 158 may send appropriate inputs to circuit 150 to cause EO element 100 to darken or to clear as appropriate. In some embodiments, a user interface (not shown) may be in communication with controller 158 of EO element 100 and may be configured to allow a user to determine whether to cause darken or clear EO element 100.

Figure 4:
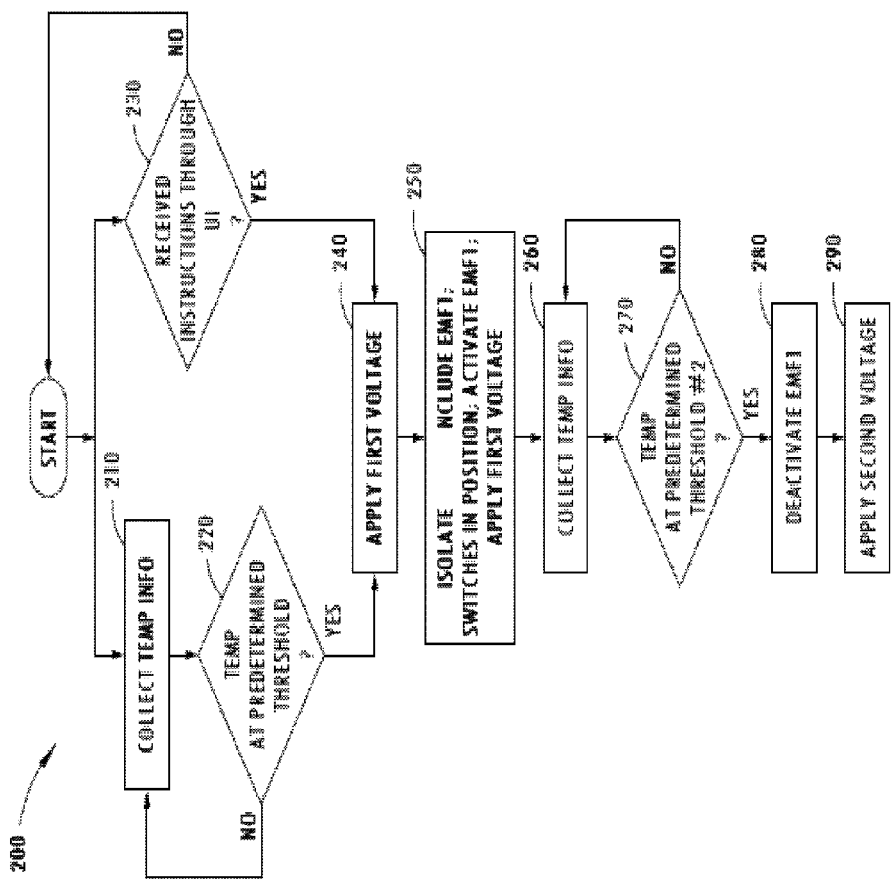
FIG. 4 is a flowchart illustrating a method for heating an electro-optic medium in accordance with this disclosure.

A flowchart of a method of heating EO medium 124 is shown in FIG. 4 at 200. In step 210, the at least one sensor 160 senses a temperature. The temperature may be the temperature of EO medium 124, or one of first and second substrates 112, 114, or of the ambient air in proximity to EO element 100. In step 220, information regarding the temperature sensed by the at least one sensor 160 may be transmitted to controller 158. Controller 158 may determine whether a predetermined temperature has been reached.

In step 230, instructions directing a change in the light transmission characteristics of EO element 100 may be received through the user interface. The instructions may be communicated to controller 158. Upon a determination that instructions regarding a change in the light transmission characteristics of EO element 100 have been received, controller 158 may determine whether a voltage should be applied to heat EO medium 124.

In some embodiments, steps 220 and 230 may take place simultaneously. In some embodiments, step 220 may precede step 230 and step 230 occurs only if it is determined that a predetermined temperature threshold has been reached. In some embodiments, step 230 may precede step 220, and step 220 takes place only after instructions on changing the light transmission characteristics of EO element 100 have been received through the user interface. Controller 158 may determine whether instructions have been received or a predetermined temperature threshold has been reached prior to moving to step 240. In some embodiments, the process may move from steps 210 and 220 directly to step 240 without determining whether instructions have been received through the user interface.

In step 240, controller may determine whether a voltage should be applied to first and second thin film electrodes 118, 120 in order to heat EO medium 124. Upon a determination that a voltage is to be applied to first and second thin film electrodes 118, 120, in step 250, controller may cause circuit 150 to isolate second EMF source 154 from circuit 150 while including first EMF source 152 in the circuit. Switches 156A-156H may be configured to allow current to flow to both first and second thin film electrodes 118, 120, and first EMF source 152 may be activated, thereby applying first voltage to circuit. Once step 250 has been completed, circuit 150 may cause the heating of EO medium. In step 260, the at least one sensor 160 may continue to monitor a temperature. In step 270, controller 158 determines whether a second predetermined temperature threshold has been reached. In step 280, once EO medium is sufficiently heated and the second predetermined threshold has been reached, the heating portion of circuit 150 may be turned off. First EMF source 152 may be deactivated and the positions of at least one of switches 156A-156H may be changed. In some embodiments, circuit may then be configured to provide the second voltage to one of first and second thin film electrodes 118, 120 to cause the light transmission characteristics of EO element 100 to change. In step 290, a second voltage that is lower than the first voltage may be applied to one of first and second thin film electrodes 118, 120 of electro-optic element 100. This may cause electro-optic element 100 to darken or to clear.

In some embodiments, heating current may be applied in pulses. In some embodiments, first EMF source 152 may be activated and deactivated in pulses to allow the intermittent provision of voltage to first and second thin film electrodes 118, 120. In some embodiments, the electrical potential for causing the darkening or clearing of EO medium 124 may be provided in pulses. Second EMF source 154 may be activated and deactivated to allow the intermittent provision of current to one of first and second thin film electrodes 118, 120. Pulses of first EMF source 152 may alternate with pulses of second EMF source 154 to begin changing the light transmission characteristics of EO medium 124 prior to the completion of the heating of EO medium 124.

The arrangement of switches in this disclosure is only one example of how the switches may be arranged to allow the provision of balanced voltage to heat first and second thin film electrodes 118, 120 and the provision of a potential difference between first and second thin film electrodes 118, 120 to allow the control of the light transmission characteristics of EO medium 124. Other arrangements of circuits, switches, and electrodes that may give the same capabilities are possible and are within the scope of this disclosure.

Approximate ranges in voltage for different parameters, in particular for the voltage applied by heating sources such as EMF 1, 3 and 5 should be selected such that the power density applied to the thin film electrodes 120 and 118 should not exceed a power density of 10 W/in2, preferably under 5 W/in2. The switching voltage delivered to the EO media 124 such as delivered by second and fourth EMF sources 130 and 132 will be dependent on the nature of EO media 124. In particular, for electrochromic materials the absolute value of the voltage would be likely under 20V, and more likely be under 10V, but the voltage will depend on the chemistry of the material itself as to what is considered an appropriate voltage. In the case of field effect devices like polymer dispersed liquid crystals the switching voltage applied by second and fourth EMF sources 130 and 132 may be in the range of 60 to 120V DC to generate diffuse state and electrically shorted to generate a clear state. In the case of a smectic type liquid crystal type EO media 124, the voltages applied by second and fourth EMF sources 130 and 132 would be in around a frequency of 10 kHz (+/−80%, +/−50%) at 60 to 120 V alternating current to switch to a diffuse state and a frequency of 100 Hz+/−100 Hz at 60 to 120 V alternating current to switch to a clear state.

FIG. 5 depicts the experimental record of optical density (OD) or absorbance of an electrochromic device in accordance to the embodiment described in FIG. 1H plotted during clearing mode at an ambient temperature of −20 deg. C. without (A) and with (B) balanced heating. The OD is defined as OD=−log(Yt/100), where Yt is the CIE Y value of the transmitted light going through an optical element. The balanced heating power density used during balanced heating was of 0.15 W/in2. It is possible to see that when balanced heating is used the time to clear from 2.3 to 0.4 is reduced from approximately 400 seconds to approximately 275 seconds, which represents a reduction in clearing time of approximately 31%.

The above description is considered that of the preferred embodiments only. Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

In this document, relational terms, such as first and second, top and bottom, front and back, left and right, vertical, horizontal, and the like, are used solely to distinguish one entity or action from another entity or action, without necessarily requiring or implying any actual such relationship, order, or number of such entities or actions. These terms are not meant to limit the element which they describe, as the various elements may be oriented differently in various applications. Furthermore, it is to be understood that the device may assume various orientations and step sequences, except where expressly specified to the contrary. It is also to be understood that the specific devices and processes illustrated in the attached drawings and described in the specification are simply exemplary embodiments of the inventive concepts defined in the appended claims. Hence, specific dimensions and other physical characteristics relating to the embodiments disclosed herein are not to be considered as limiting, unless the claims expressly state otherwise.

The invention claimed is:

1. A system for selectively heating electro-optic media comprising:
    an electro-optic (EO) device comprising:
        a first substrate having a first surface and a second surface;
        a second substrate having a third surface and a fourth surface;
        a chamber defined between opposed second surface of first substrate and third surface of second substrate;
        an electro-optic medium disposed within the chamber;
        a first thin film electrode associated with the second surface of the first substrate; and
        a second thin film electrode associated with the third surface of the second substrate; and
    a circuit in communication with the first and second thin film electrodes, comprising:
        a first busbar electrode associated with the first thin film electrode;
        a second busbar electrode associated with the first thin film electrode;
        a third busbar electrode associated with the second thin film electrode;
        a fourth busbar electrode associated with the second thin film electrode;
        a first EMF source capable of producing a first voltage and in communication with the second busbar and the third busbar.

2. The system of claim 1, wherein the circuit further comprises:
    a second EMF source in communication with the first busbar and the second busbar and capable of producing a second voltage different from the first voltage;
    a third EMF source in communication with the third busbar and the fourth busbar and capable of producing a third voltage similar in magnitude to the first voltage; and
    a plurality of switches configured to control the application of first, second and third voltages to the first and second thin film electrodes; and
    wherein the system further comprises a controller in communication with the circuit and configured to control the switches, the first EMF source, the second EMF source, and the third EMF source.

3. The system of claim 2, further comprising a fourth EMF source in communication with the controller and the first busbar and the fourth busbar.

4. The system of claim 3, further comprising:
    a dual output electrical transformer comprising at least a first and a second secondary windings inductively coupled to a primary winding, where terminals of the first secondary winding are in communication with the first and second busbars and terminals of the second secondary winding are in communication with the third and fourth busbars; and
    a fifth EMF source capable of delivering an alternating current voltage to the primary winding of the dual output electrical transformer.

5. The system of claim 1, further comprising:
    a heating power source;
    a first amplifier in communication with the third busbar;
    a second amplifier in communication with the second busbar;
    a third amplifier in communication with the fourth busbar;
    a fourth amplifier in communication with the first busbar;
    an alternating current power source in communication with the first and second amplifiers; and
    an inverter circuit comprising a fifth amplifier in communication with the alternating current power source;
    wherein the first, second, third, and fourth amplifiers are in communication with the heating power source;
    wherein the third and fourth amplifiers are in communication with an output of the inverter circuit.

6. The system of claim 5, further comprising a fourth EMF source in communication with the controller and the first busbar and the fourth busbar.

* * * * *